Dec. 3, 1935.  A. LAZARUS ET AL  2,022,725
LOCKING DEVICE FOR VEHICLES
Filed Dec. 28, 1934  2 Sheets-Sheet 1
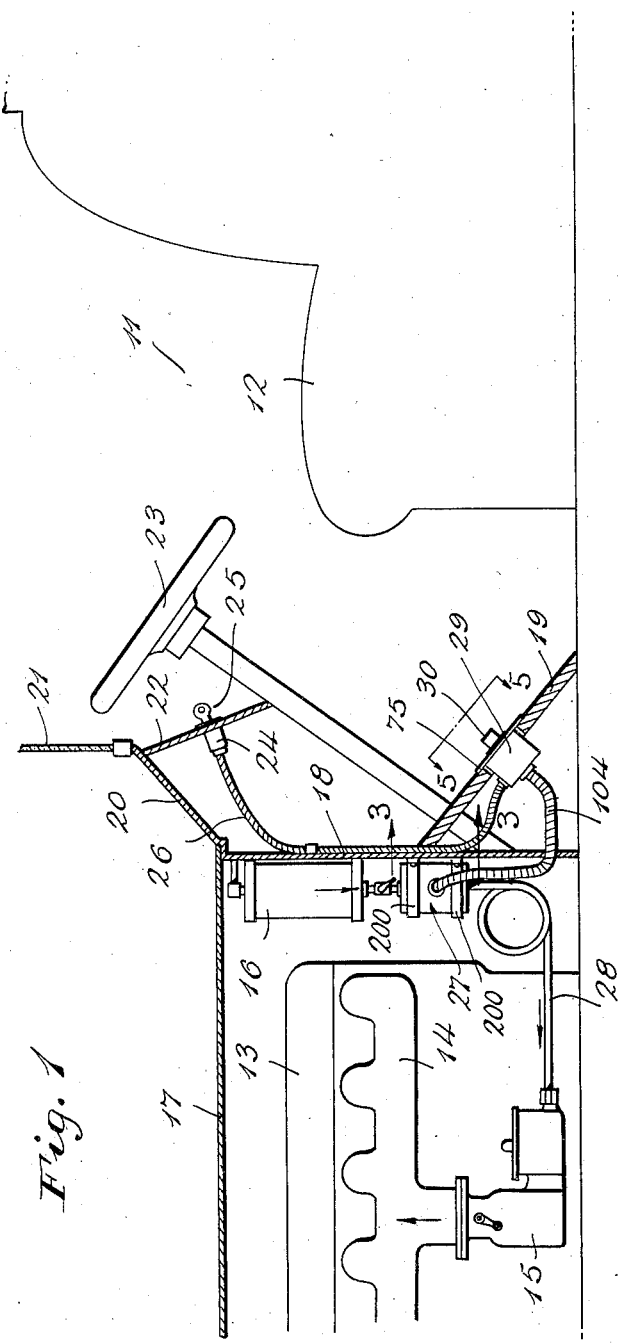
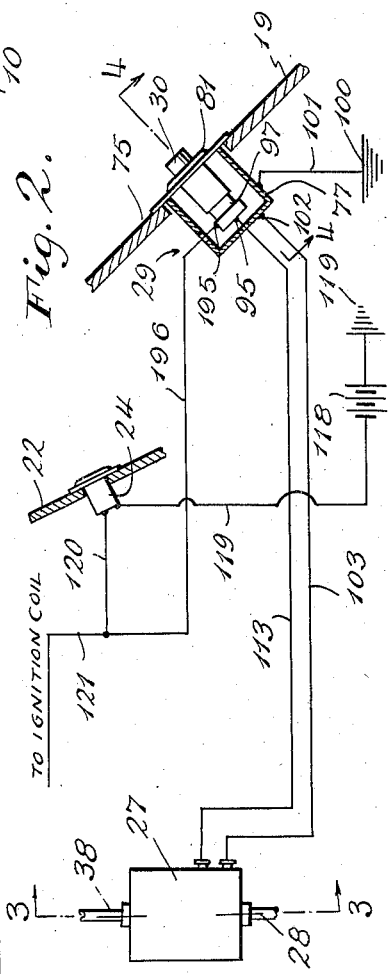
INVENTORS
ALEXANDER LAZARUS
ABRAHAM BROWN
BY
Richards & Geier
ATTORNEYS Dec. 3, 1935.  A. LAZARUS ET AL  2,022,725
LOCKING DEVICE FOR VEHICLES
Filed Dec. 28, 1934  2 Sheets-Sheet 2
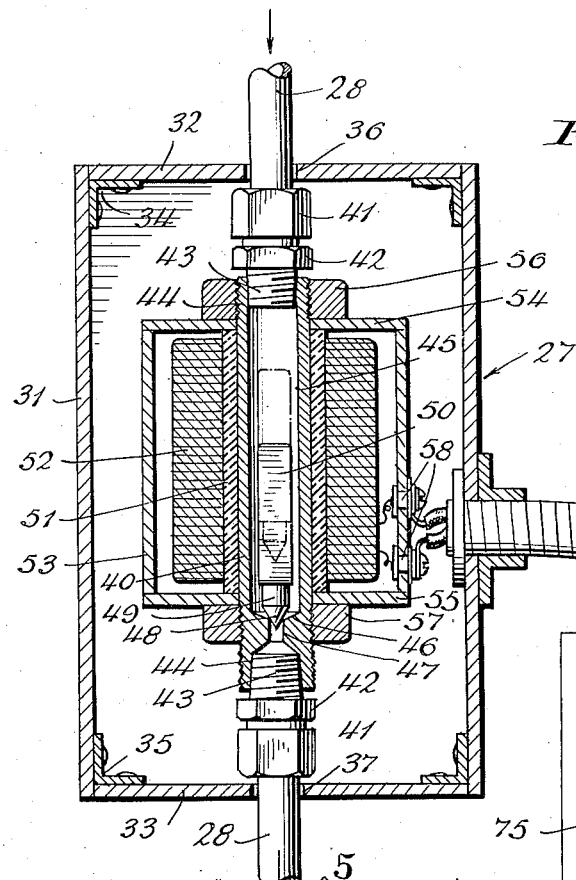
INVENTORS
ALEXANDER LAZARUS
ABRAHAM BROWN
BY Richards & Geier
ATTORNEYS Patented Dec. 3, 1935

2,022,725

UNITED STATES PATENT OFFICE 2,022,725

LOCKING DEVICE FOR VEHICLES

Alexander Lazarus, Ozone Park, and Abraham Brown, Brooklyn, N. Y.

Application December 28, 1934, Serial No. 759,486

10 Claims. (Cl. 123—198)

The present invention relates to a device for preventing stealing of automobiles, trucks and similar vehicles, and it particularly relates to a device for preventing the unauthorized taking of automobiles, trucks or other vehicles while in operating condition.

Most locking devices for automobiles, trucks or other vehicles are designed to prevent abstraction or stealing thereof while it is in non-operating condition, and include mechanisms for locking the steering mechanism, the ignition circuit, the emergency brake, the wheels and so forth. These devices are generally designed to prevent a parked vehicle from being stolen while the owner of such vehicle has left the car either in the street and/or in a garage.

However, these devices for the most part are ineffective to prevent the stealing of operating automobiles, trucks or other vehicles, by persons who may be riding as guests or passengers in the moving vehicle, or by outsiders when they approach the operating vehicle either when it is standing still with its engine running and/or while it is moving on the open road with an authorized operator thereof in charge.

It is not readily possible for the operator of the automobile, under these last-mentioned circumstances to manipulate the usual locking device adapted to prevent unauthorized removal of a parked or non-operating automobile, since he would usually be forcibly prevented from manipulating such various locking devices, and even if he could manipulate them, he would be compelled by threats or forcible persuasion to unlock the vehicle so that the vehicle might be removed by the unauthorized person.

It is an object of the present invention to provide an improved locking device for automobiles which will prevent theft of an operating automobile, truck or similar vehicle while operating under the control of its owner or of an authorized operator which may be actuated so as not to be readily apparent to the person attempting to cause or conduct such theft or unauthorized abstraction of the vehicle.

Another object is to provide an improved locking device to prevent theft of automobiles, trucks or other vehicles which may be readily operated incidental to theft of the car without ready detection by the thief or person stealing the automobile and which at the same time will permit the automobile to be removed a short distance from the owner or operator so that he may have sufficient time to give an alarm before the automobile is automatically stopped.

Other objects will appear during the course of the following specification.

In accomplishing the above objects it has been found most satisfactory to provide a device which may be operated by the foot of the operator and which may be positioned closely adjacent to the accelerator pedal, clutch pedal, starter pedal or brake pedal and which will function to cut off the fuel supply to the automotive vehicle engine with the result that the engine may be operated after actuation of the lock for a short time before it will stop because of lack of fuel supply.

In one form of the automobile it has been found desirable to connect the lock switch with the ignition circuit, the lock switch preferably being provided by a foot-operated plunger normally out when the car is operated, but most conveniently pressed inwardly to cut off further fuel supply for operating the automotive vehicle.

Preferably the electrical circuit includes a solenoid operated valve positioned before the carburetor and between the vacuum tank, fuel pump and/or gasoline supply tank, and the carburetor so that there will be a limited supply available in the carburetor for permitting continuation of operation of the automotive vehicle.

The locking switch is preferably provided with a key locking means which need only be inserted and operated after the plunger has been operated so as to cut off the feed line circuit.

The above and other objects will appear more clearly from the following detailed description when taken in connection with the accompanying drawings, which illustrate a preferred embodiment of the inventive idea.

In the drawings:

Figure 1 is a diagrammatic side view of an automotive vehicle in section illustrating the driver's compartment, the engine and the locking device of the present invention.

Figure 2 is a diagrammatic side view similar to Fig. 1 illustrating the wiring diagram.

Figure 3 is a side sectional view upon an enlarged scale illustrating the valve arrangement on the line 3—3 of Fig. 1.

Figures 4 and 5 show the locking device upon a larger scale than shown in Fig. 1, Fig. 4 being a side sectional view on the line 4—4 of Fig. 5, and Fig. 5 being a front view on the line 5—5 of Figs. 1 and 4.

Referring to Fig. 1 the automobile has a chassis frame 10, an operator's enclosure 11 provided with a seat 12. The chassis frame 10 supports the engine 13 which is provided with an intake manifold, 14, the carburetor 15, and the gasoline vacuum supply tank 16 which is suitably connected to the gasoline supply tank (not shown) in the rear of the car.

The hood 17 encloses the engine and the engine compartment is separated from the driver's compartment by a vertical dashboard 18 and the inclined floor or footboard 19. The cowl 20 extends forwardly from the engine to the windshield 21 and connects with the instrument board 22, positioned closely adjacent the steering wheel 23.

The instrument board conveniently carries the usual ignition lock 24, of which the key 25 is indicated, said ignition lock being provided with the tubular enclosure 26.

The structure thus far described is a conventional construction, which forms no part of the present invention.

In the present invention a solenoid operated valve unit 27 is positioned on the gasoline line 28 from the vacuum tank 16 to the carburetor 15, and the locking switch 29 provided with the plunger 30, is conveniently positioned as indicated in the footboard 19 to enable manipulation by the operator of the car while seated in operating position on the seat 12.

The solenoid valve unit 27, as best shown in Fig. 3 preferably consists of the cylindrical enclosure 31 which may be made of metal which is closed at its ends by the plates 32 and 33 held to the cylindrical walls by the brackets 34 and 35.

The casing 31 is held on the dashboard 18 by the straps 200 (see Fig. 1). The plates 32 and 33 (see Fig. 3) are respectively provided with the openings 36 and 37 for the admission of the gasoline conduit 28.

The gasoline conduit 28 is preferably coupled to the valve seat cylinder 40 by the nuts 41 and the adaptor elements 42, which latter are provided with threaded nipple portions 43 threaded into the tapped end portions 44 of the cylindrical valve seat member 40.

The valve seat member 40 is provided with an enlarged chamber 45 which has a bevelled shoulder 46 at the small bore passage 47.

The valve element 48 is of conical shape to fit into the end of the small bore 47, and the valve has a stem 49 which connects it to the soft steel or iron body member 50. The valve 48—50 in closed position assumes the solid line position, and in open position assumes the dotted line position.

Encircling the cylinder 40 of the valve seat member is the solenoid retainer 51 encircled by the solenoid 52, which solenoid is enclosed in a cylindrical shell 53. The shell 53 is enclosed at its end portions by the plates 54 and 55, to which the cylinder 40 is firmly clamped by the nuts 56 and 57. The solenoid is provided with the screw connections 58 to which are connected the electrical conductors 103—113 enclosed in the tubular enclosure 104.

Referring to the latch and/or locking device of Figs. 4 and 5, the device is provided with a face plate 75. This plate together with the outturned flanges 76 of the cup enclosure 77 is riveted at 78 to the footboard 19. The face plate 75 is provided with a central opening 79 (see Fig. 4) through which projects the cylindrical element 80. The element 80 is connected to said face plate 75 by the threaded nut 81.

The sleeve 80 (see Figs. 4 and 5) receives the plunger 30 of the lock, which at its forward face is provided with a key opening 83 and turning tumbler 84.

The plunger 30 is adapted to slide within the cylinder 80 and it is provided with a latch 85 which may be alternately received in the recesses 86 and 87, in the cylindrical sleeve 80. The enclosing cylindrical bracket 88 covers the latch recesses 86 and 87. The key is provided with the usual projections (not shown) which move the latch 85 in and out as desired, as in the usual "Yale" locks.

To the end of the plunger 30 is connected the rod 89 which passes through an opening 90 in the insulating plate 91. The end of the plunger carries the insulating disc member 92 upon the face of which is the metallic contact element 93. The element 93 closes the circuit across the contacts 94 and 194 attached to the face of the insulating plate 91 and to which connection is made at 95 and 195 from the conduits 113 and 196 respectively.

The coil spring 197 (see Fig. 4) reacting between the base of the plunger at 98 and the plate 91 presses the plunger 30 outwardly when the latch 85 is removed from the recess 87 by operation of a key in the key opening 83, and the outward movement of the plunger 30 will be stopped when said latch is received in the recess 86.

It will be noted in the normal position, as shown in Fig. 4 the plunger 30 is out and electrical connection is established between the contacts 94 and 194 and the conductors 113 and 196, whereas if the foot is pressed upon the plunger 30 the contact 93 will be pressed away from the electrical contact elements 94 and 194, which will open the circuit between the conductors 113 and 196. It is not necessary to describe the internal mechanism of the locking switch 30 since this switch may be conveniently of standard construction and since many varying constructions now on the market may be utilized.

By reference to the wiring diagram of Fig. 2 the electrical connections will become readily apparent. Referring to this wiring diagram the ground 100 is connected at 101 to the casing 77 of the plunger lock 29. This connection may be through the frame of the car or in some other manner. Connected to the casing 77 at the point 102 and through the casing to the ground 100, is the electrical conduit 103 which is enclosed in the casing 104 (see Figs. 3 and 4). To the connection 95 is connected the conduit 113 leading back from the solenoid 52 and to the connection 195 is connected the conductor 196, which in turn connects to the conductors 119, 120 and 121 of the ignition switch circuit. The conductor 119 is connected to the batteries 118, which are connected to the ground 219.

It is apparent, therefore, that when the ignition lock is turned on and when the plunger 30 is out the solenoid 27 will be energized through the circuit 100, 101, 103, 113, 196, 120, 119, and 118. The circuit between the conduits 103 and 113 extends through the solenoid 52.

The energization of the solenoid 52 will cause elevation of the valve 48—50 to the dotted line position of Fig. 3, with the result that fuel or oil can flow from the vacuum tank 16 (or an equivalent fuel source such as the fuel pump or a gasoline tank), to the carburetor 15 and the mixture may flow therefrom to the intake manifold 14.

Ordinarily the plunger 30 is left out at all times and to start the car, it is only necessary to close the ignition circuit through the contacts 94 and 194 in the plunger device 29 being closed at all times by the contact 93.

However, when an attempt is made to steal the car or hijackers appear, by an unobvious and non-apparent movement of his foot the driver will force the plunger 30 down, removing the contact 93 from the contact elements 94 and 194 and opening the circuit through the solenoid 52 without affecting the circuit through the ignition coil (not shown). This will cause the valve 48—50 to drop against its seat 46, cutting off the fuel supply 16 from the carburetor 15 and the car will only continue operating a few blocks until the fuel supply in the carburetor has been exhausted.

Meanwhile, the operator of the car who has been ejected therefrom will have had time to spread the alarm or to have telephoned the police, with the result that there is a greater assurance that the car will be recovered and the criminals apprehended.

Even though the operator of the car be carried in the car and it is stopped, after the thief has driven the car for several blocks, it will not be readily obvious to the thief that the car stopped because of some previous act of the operator, which the thief did not notice.

What is claimed is:

1. In an automobile locking device to prevent stealing of the operating vehicle, comprising means to cut off the fuel supply to the engine of the automotive vehicle, which at the same time will leave sufficient fuel to permit the vehicle to operate for a short time and/or distance, and means to permit said first-mentioned means to be readily operated without detection, said first-mentioned means comprising a weighted valve located before the carburetor seated by gravity and provided with an encircling solenoid to unseat the same when energized and said second-mentioned means comprising a push device to deenergize the solenoid located on the floor of the car adjacent the pedals which may be readily pressed by the foot without substantially moving the foot from pedal actuating position.

2. In a locking device to prevent the abstraction of an operating automobile from the authorized operator thereof, means to cut off the fuel line ahead of the carburetor and manipulative means to enable the operation of said first-mentioned means without ready detection, said first-mentioned means comprising a gravity seated valve provided with a solenoid which when energized will unseat the valve and said second-mentioned means consisting of a plunger device actuated by the foot to de-energize the solenoid and being located adjacent the clutch and brake pedal actuating position.

3. In an automotive vehicle of the type having an engine, a liquid fuel supply and a carburetor supplied from said liquid source of supply and supplying said engine; the combination therewith of a device to prevent abstraction of an automobile, which comprises a gravity seated valve device on the line from the fuel supply to the carburetor, said valve being provided with a solenoid which, when energized, unseats the valve and unobtrusive means enabling ready operation of said valve to prevent continued operation of the automobile including a device readily actuated by the foot when in brake and clutch pedal actuating position without substantial movement therefrom.

4. In an automobile of the type having an engine, a liquid fuel supply therefor and a carburetor arranged in line of flow from said supply to said engine, and an ignition circuit provided with a key operated lock on the instrument board; the combination therewith of an anti-theft device to prevent stealing of the automobile while operating and while in the control of an authorized person, said locking device including a solenoid controlled, gravity-closed valve on the fuel line from the supply to the carburetor, such solenoid controlled valve being directly operated by the solenoid and opened when the solenoid is energized and closed when the solenoid is not energized, and a plunger switch positioned in the footboard of the automobile including a projecting plunger element, a cylindrical slide to receive said plunger, cooperating latching means between said plunger and said cylindrical slide having two latching positions, two electrical contacts fixed to the switch housing connected to said ignition circuit, another contact on the plunger closing the said circuit across said contacts when the plunger is projecting and opening said circuit when the plunger is depressed, the circuit through said plunger being connected to said solenoid, whereby when said plunger is depressed the solenoid circuit will be opened, causing the valve to close the fuel line.

5. A device of the character described comprising a valve for controlling the supply of fuel to the engine of a vehicle, weight means for normally urging the valve closed, solenoid means for holding the valve open, electrical means for energizing the solenoid, and a circuit including a source of current supply, a manually operable switch, and means immediately operable following closing of said switch, to supply current to the electrical means, the carburetor of the vehicle storing sufficient fuel to permit a limited continued operation of the vehicle.

6. A device of the character described comprising a valve for controlling the supply of fuel to the engine of a vehicle, weight means for normally urging the valve closed, means for holding the valve open, electroresponsive means for actuating the last means to open the valve, and a circuit including a source of current supply, a manually operable switch, and means immediately operable following closing of said switch to supply current to the electroresponsive means, the carburetor of the vehicle storing sufficient fuel to permit a limited continued operation of the vehicle.

7. A device of the character described comprising a valve for controlling the supply of fuel to the engine of a vehicle, means for normally urging the valve closed, solenoid means for holding the valve open, electroresponsive means for actuating the solenoid means to open the valve and permit closing thereof, and a circuit including a source of current supply, a manually operable switch, means immediately operable following closing of said switch, to supply current to the electroresponsive means, the ignition circuit of the engine being maintained upon closing of switch and the carburetor of the vehicle storing sufficient fuel to permit a limited continued operation of the vehicle.

8. In an automobile locking device to prevent stealing of the operating vehicle, comprising means to cause a stoppage of the engine of the automotive vehicle, which will permit the vehicle to operate for a short time and/or distance and including a weight seated and electrically opened valve in the fuel line before the carburetor, foot operated means adjacent the brake and clutch pedals to permit said first mentioned means to be operated.

9. In a locking device to prevent the abstraction of an operating automobile from the authorized operator thereof, a device to cut off the fuel line ahead of the carburetor including a weight seated and electrically opened valve in the fuel line before the carburetor, and manipulative means to initiate the automatic operation of said first mentioned means consisting of a foot-actuated element positioned adjacent the pedals of the automobile.

10. In an automotive vehicle of the type having an engine, a liquid fuel supply and a carburetor supplied from said liquid source of supply and supplying said engine; the combination therewith of a device to prevent abstraction of an automobile, which comprises a weight closed valve on the line from the fuel supply to the carburetor, a solenoid control for said valve to maintain said valve in open position, and foot-actuated means to cause de-energization of said solenoid and thereby to close said valve whereby continued operation of the automobile is prevented.

ALEXANDER LAZARUS.
ABRAHAM BROWN.